United States Patent [19]
Takeda

[11] Patent Number: 5,739,470
[45] Date of Patent: Apr. 14, 1998

[54] WIRE HARNESS PROTECTOR WITH COVER AND ADJACENT U-SHAPED GROOVES

[75] Inventor: Ikuo Takeda, Shizuoka, Japan

[73] Assignee: Yazaki Corporation, Tokyo, Japan

[21] Appl. No.: 545,176

[22] Filed: Oct. 19, 1995

[30] Foreign Application Priority Data

Nov. 8, 1994 [JP] Japan .................. 6-273831

[51] Int. Cl.[6] .................................................. H02G 3/04
[52] U.S. Cl. .................................. 174/97; 174/101
[58] Field of Search ........................ 174/95, 96, 97, 174/101, 68.1, 68.3, 98, 135

[56] References Cited

U.S. PATENT DOCUMENTS

| 2,136,583 | 11/1938 | Corbett ................ 174/72 C |
| 4,937,400 | 6/1990 | Williams ................ 174/95 |

FOREIGN PATENT DOCUMENTS

| 1135514 | 4/1957 | France ................ 174/97 |
| 2330166 | 2/1975 | Germany ................ 174/135 |
| 212289 | 8/1984 | Germany ................ 174/97 |
| 56-54818 | 5/1981 | Japan ................ H02G 3/04 |
| 397020 | 2/1966 | Switzerland ................ 174/97 |

*Primary Examiner*—Kristine L. Kincaid
*Assistant Examiner*—Kamand Cuneo
*Attorney, Agent, or Firm*—Sughrue, Mion, Zinn, Macpeak & Seas, PLLC

[57] ABSTRACT

A wire harness protector includes a protector body having a wire harness accommodating groove which is extended along a wire harness laying line to fixedly accommodate a wire harness; and a protector cover which is engaged with the protector body in such a manner as to cover the opening of the wire harness accommodating groove. In the protector, a wire-like part accommodating groove is formed outside a side wall of the protector body which defines the wire harness accommodating groove, in such a manner that the wire-like part accommodating groove is opened towards the mounting surface of the wire harness protector to accommodate a wire-like part which is laid along the wire harness laying line.

6 Claims, 5 Drawing Sheets

WIRE HARNESS PROTECTOR WITH COVER AND ADJACENT U-SHAPED GROOVES

BACKGROUND OF THE INVENTION

1. Field of the Invention

This invention relates to a wire harness protector which is extended along a predetermined line along which a wire harness is laid (hereinafter referred to as "a wire harness laying line", when applicable), to accommodate the wire harness thereby to protect the latter.

2. Related Art

In laying a wire harness on a vehicle body, sometimes a wire harness protector is used. The wire harness protector is a casing of resin which is laid along a wire harness laying line to accommodate a wire harness thereby to protect the latter. The wire harness protector is used mainly when a wire harness is laid in the exposed part of a trunk room or an engine compartment.

In the case of laying a wire harness, for instance, in a trunk, there are wire-like parts which should be laid together with the wire harness for the purpose of facilitating the assembling work. The wire-like parts are, for instance, a washer solution pipe used to supply a window washer solution, and a trunk opening wire used to open and close a trunk.

FIG. 8 shows a wire harness protector 3 which has been disclosed, for instance, by Japanese Utility Patent Application (OPI) No. 54818/1981 (the term "OPI" as used herein means an "unexamined publication application"). The wire harness protector 3 is so designed that it protects not only a wire harnesses 1 but also a wire-like parts 2 such as the above-described washer solution pipe or trunk opening wire.

The wire harness protector 3 is formed as one unit by molding synthetic resin, and comprises a wire harness accommodating board 4 for accommodating wire harnesses 1; and wire-like part holding members 5 for holding wire-like parts 2. In addition, the wire harness protector 3 has mounting holes 6 which are used to fixedly mount the wire harness protector 3 on a vehicle body or the like.

More specifically, the wire harness accommodating board 4 is substantially in the form of a groove which is opened towards its mounting surface through which the protector is mounted on a vehicle body or the like. The wire harness accommodating board 4 includes a flange 7 which provides the aforementioned mounting surface. The above-described mounting holes 6 are formed in the flange 7. Each of the wire-like part holding members 5 is a piece of plate which is held upright on the outer surface of the flange 7, and has slits 8 for holding the wire-like parts.

After the wire harnesses 1 have been laid on the wire harness protector 3, the latter 3 is conveyed for instance to a vehicle assembling station. At the station, the protector 3 is fixedly secured to a predetermined part of the vehicle body frame, and the wire-like parts 2 are laid by using the wire-like part holding members 5.

With the wire harness protector 3, the wire-like parts 2 can be laid without use of special fixing means; that is, they can be laid with high efficiency.

However, the above-described conventional wire harness protector 3 is disadvantageous in the following points:

With the wire harness protector 3, the wire-like parts 2 are held exposed. Hence, for instance in the case where the protector 3 is used for laying wire harnesses in the trunk, articles accommodated in the trunk may be caught by the wire-like parts 2, thus damaging the wire-like part holding members 5 and/or the wire-like parts 2. In addition, the wire-like parts 2 thus exposed are not attractive in external appearance.

SUMMARY OF THE INVENTION

Accordingly, an object of the invention is to eliminate the above-described difficulties accompanying a conventional wire harness protector. More particularly, an object of the invention is to provide a wire harness protector adapted to accommodate not only a wire harness but also a wire-like part in which the wire-like part accommodated therein is positively prevented from being damaged by external articles or the like.

The foregoing object of the invention has been achieved by the provision of a wire harness protector which is laid along a wire harness laying line while fixedly accommodating a wire harness, which, according to the invention, comprises: a protector body having a wire harness accommodating groove which is formed along the wire harness laying line to accommodate the wire harness; and a protector cover which is engaged with the protector body in such a manner as to cover the opening of the wire harness accommodating groove, a wire-like part accommodating groove being formed outside a side wall of the protector body which defines the wire harness accommodating groove, in such a manner that the wire-like part accommodating groove is opened towards the mounting surface of the wire harness protector to accommodate a wire-like part which is laid along the wire harness laying line.

The object of the invention has been more effectively achieved by the wire harness protector in which, according to an invention, the space is employed as the wire-like part accommodating groove, defined by the side wall of the protector body which defines the wire harness accommodating groove and a side wall of the protector cover which covers the protector body.

The wire harness protector of the invention is designed as described above. Hence, when the protector cover is engaged with the protector body which has fixedly accommodated the wire harness in the wire harness accommodating groove, the wire-like part accommodating groove is formed inside the protector cover and outside the side wall of the protector body in such a manner that it is opened towards the mounting surface of the wire harness protector.

Therefore, the wire-like part to be laid along the wire harness laying line can be accommodated in the wire-like part accommodating groove before the wire harness protector is mounted on a vehicle body frame or the like. Hence, by fixedly mounting the wire harness protector on the vehicle body frame or the like, the opening of the wire-like part accommodating groove is closed.

To summarize, when the wire harness protector is fixedly mounted on the vehicle body frame or the like, the wire-like part is surrounded by the side walls of the protector body and of the protector cover and the vehicle body frame or the like; that is, it is not exposed, thus being protected.

The protector body and the protector cover are so designed in sectional configuration that the wire-like part accommodating groove is the space which is defined by the side wall of the protector body which defines the wire harness accommodating groove and the side wall of the protector cover which covers the protector body. This feature simplifies the structure of the wire harness protector, and allows the wire harness accommodating groove and the wire-like part accommodating groove to be isolated from each other and high in accommodation capacity.

3

BRIEF DESCRIPTION OF THE DRAWING(S)

Figure 1:
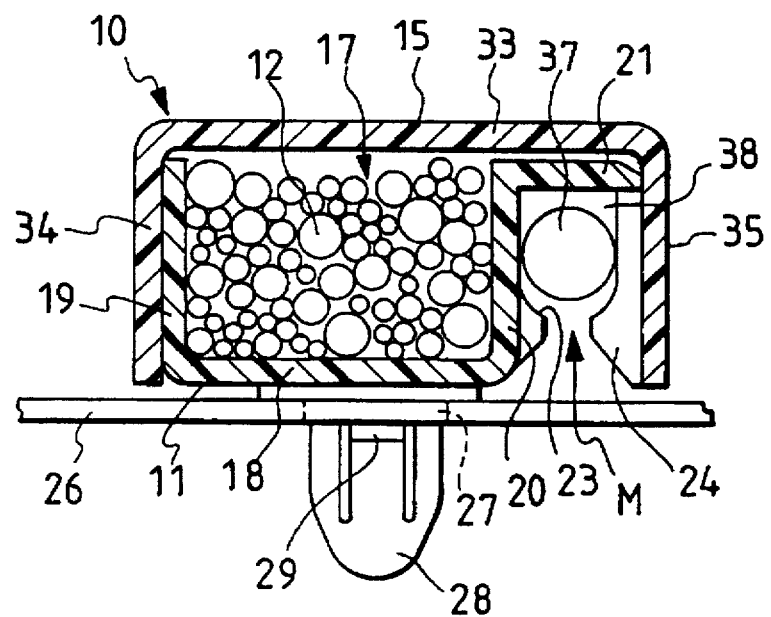
FIG. 1 is a cross sectional view showing an example of a wire harness protector, which constitutes a first embodiment of the invention.
Figure 3:
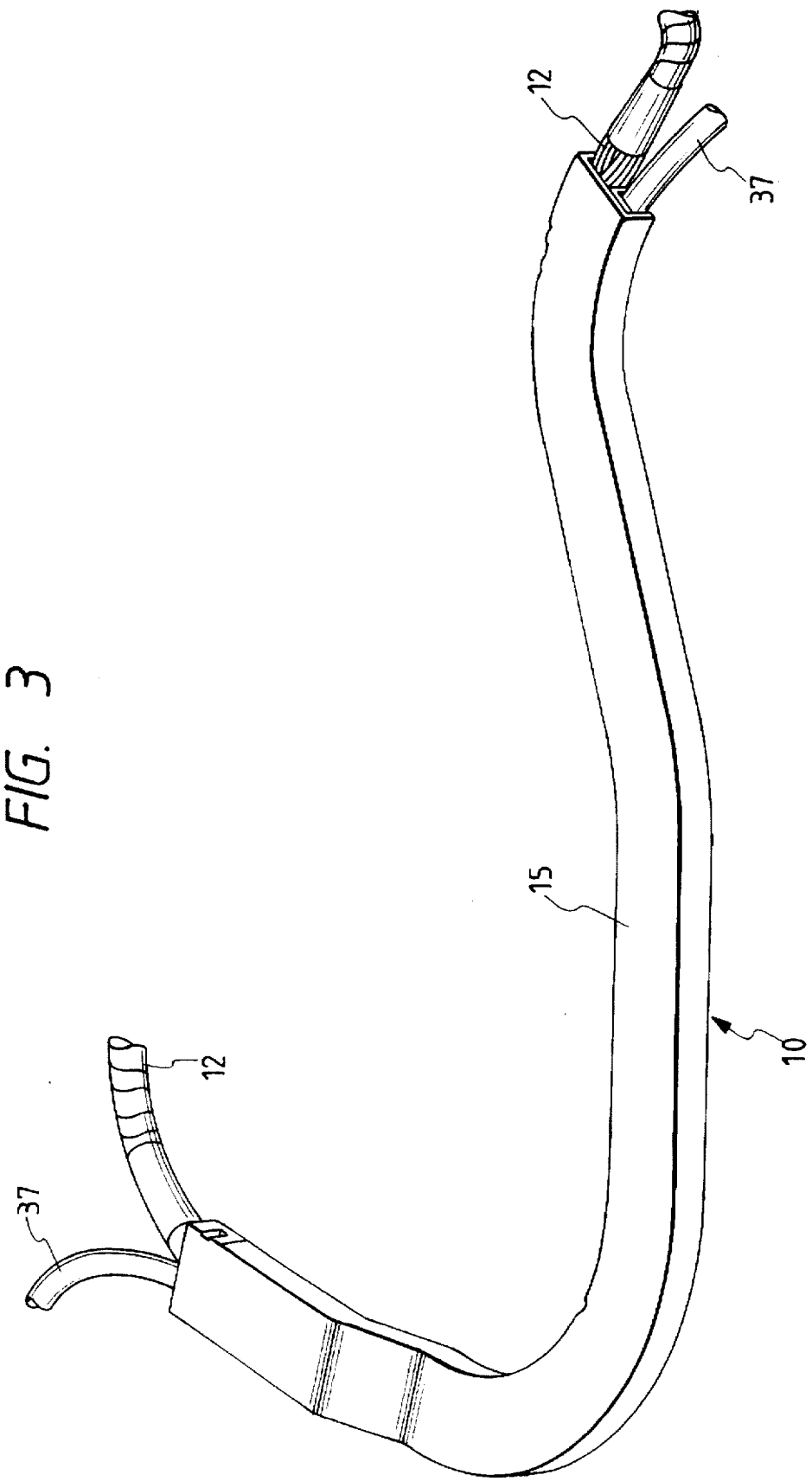

FIG. 3 a perspective view of the wire harness protector shown in FIG. 1.

Figure 4:
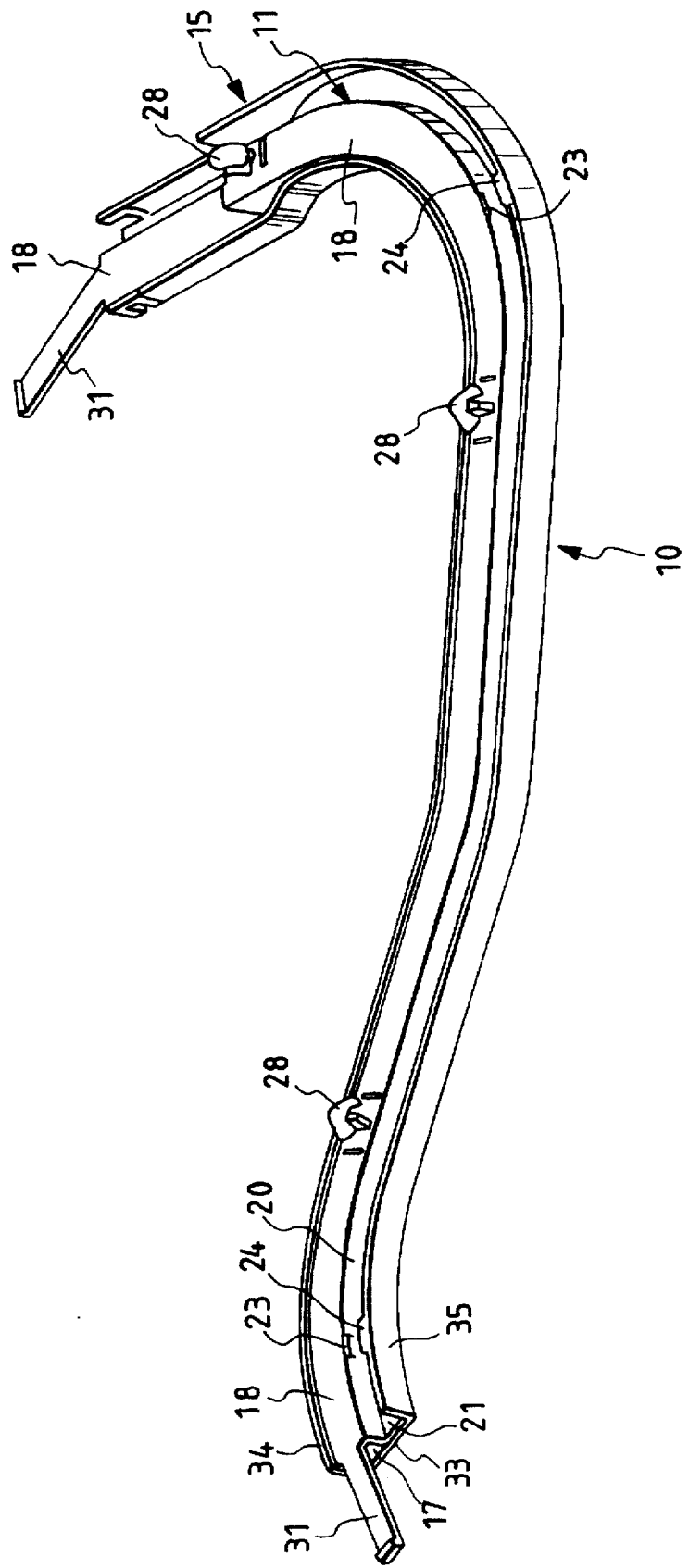

FIG. 4 is a perspective view of the wire harness protector as viewed from the protector mounting side.

Figure 5:
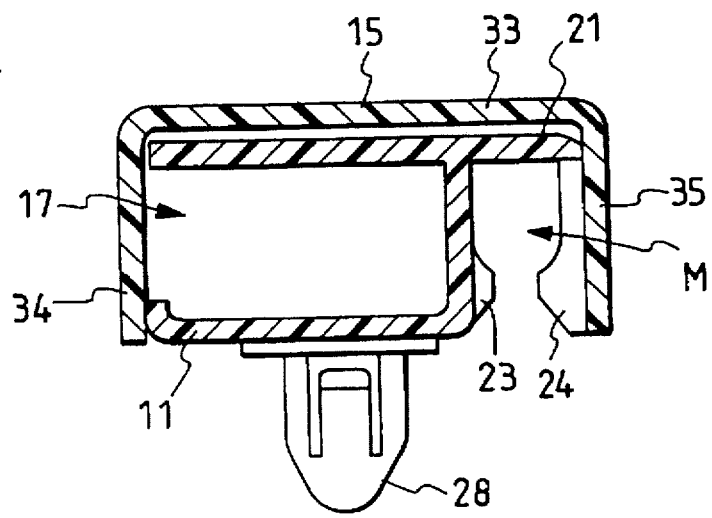

FIG. 5 is a cross sectional view showing another example of the wire harness protector, which constitutes a second embodiment of the invention.

Figure 6:
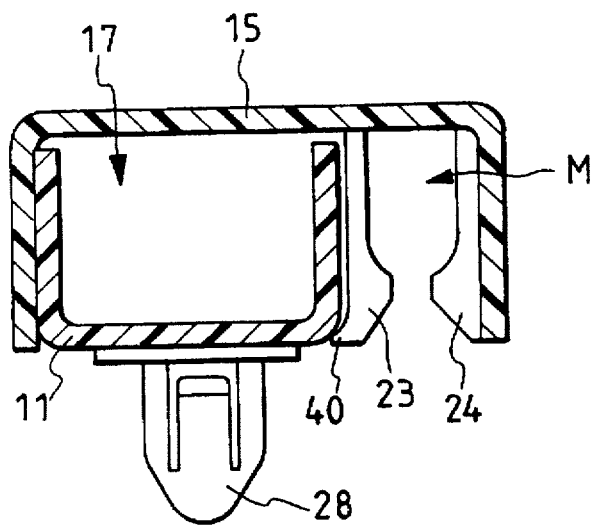

FIG. 6 is a cross sectional view showing another example of the wire harness protector, which constitutes a third embodiment of the invention.

Figure 7:
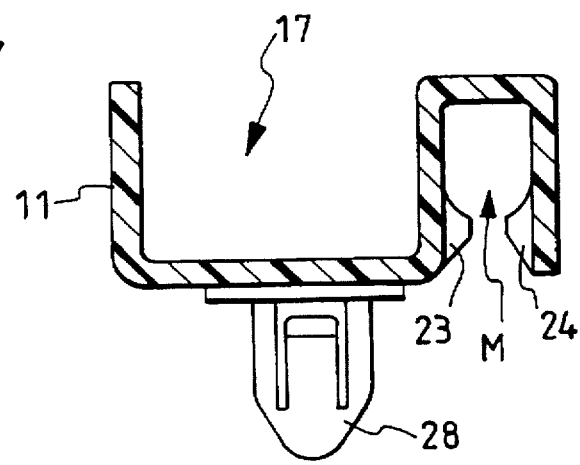

FIG. 7 is a cross sectional view showing another example of the wire harness protector, which constitutes a fourth embodiment of the invention.

Figure 8:
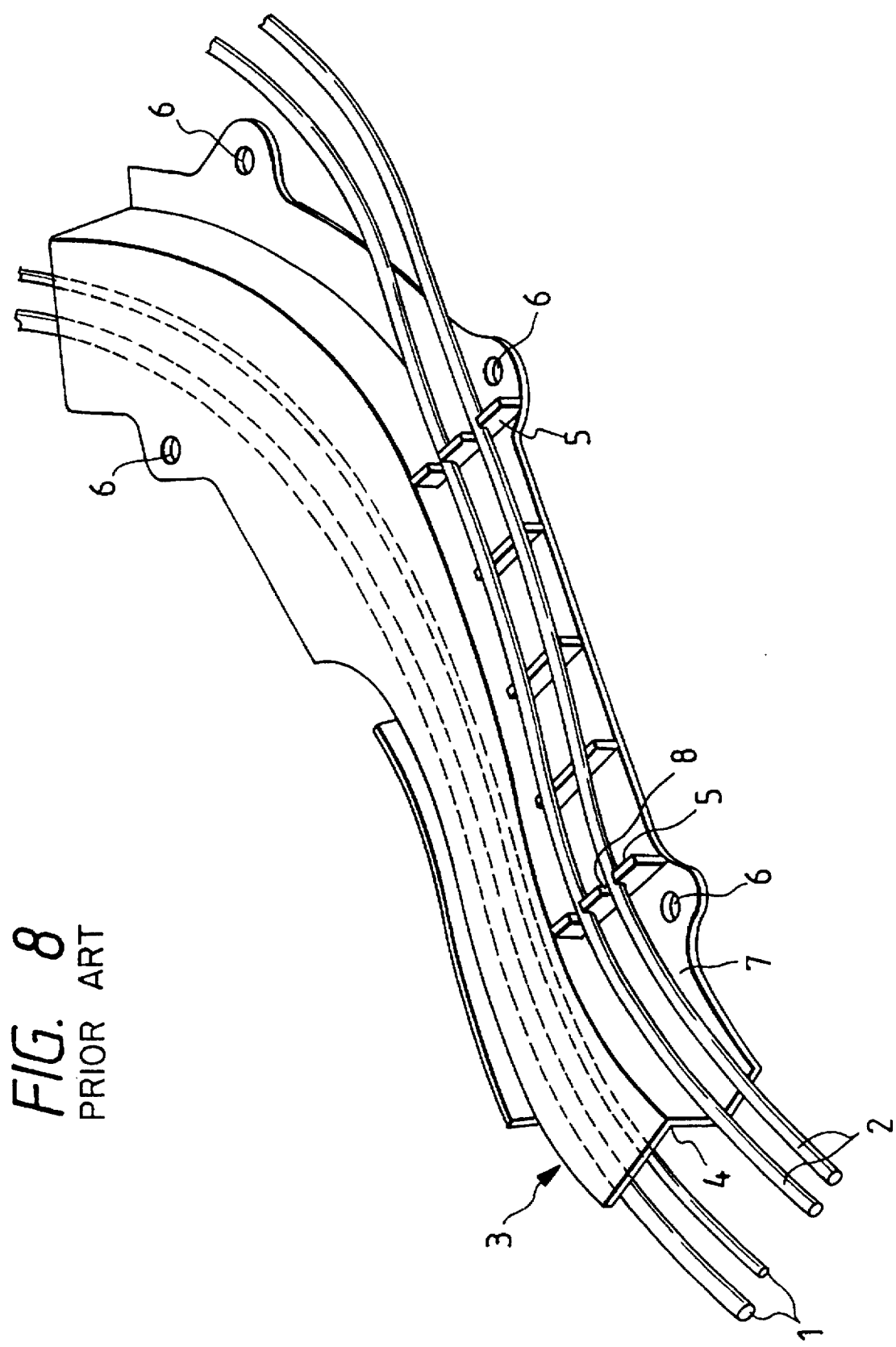

FIG. 8 is a perspective view showing a conventional wire harness protector.

DETAILED DESCRIPTION OF THE PREFERRED EMBODIMENTS

Figure 2:
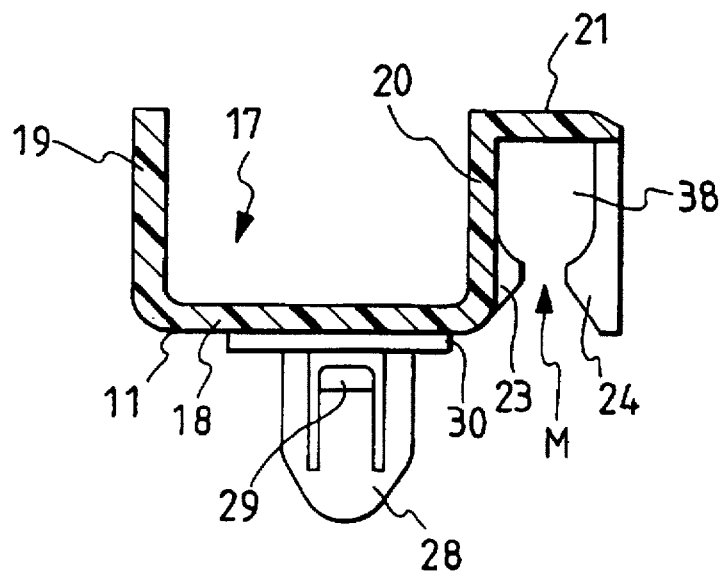
FIG. 2 is a cross sectional view of a protector body shown in FIG. 1.

A wire harness protector, which constitutes a first embodiment of the invention, will be described with reference to FIGS. 1 through 4. FIG. 1 is a cross-sectional view of the wire harness protector which has been assembled. FIG. 2 is a cross-sectional view of a protector body shown in FIG. 1. FIG. 3 is a perspective view of the wire harness protector shown in FIG. 1. FIG. 4 is a perspective view of the wire harness protector as viewed from the protector mounting side.

In those figures, the wire harness protector of the invention is generally indicated at 10. In this case, a wire harness 12 is to be laid in the trunk of a motor car. The wire harness protector 10 is laid along a predetermined wire harness laying line to fixedly accommodate the wire harness 12 thereby to protect the latter 12. The wire harness protector 10, as shown in FIG. 1, comprises a protector body 11, and a protector cover 15 adapted to cover the protector body 11. The protector body 11 and the protector cover 15 are formed by molding insulating synthetic resin.

The protector body 11, and the protector cover 15 will be described in more detail.

As shown in FIGS. 1 and 2, the protector body 11 has a wire harness accommodating groove 17 to accommodate the wire harness 12 which is to be laid along the wire harness laying line in the trunk. The wire harness accommodating groove 17 is U-shaped in cross section, having a bottom wall 18 and right and left side walls 20 and 19 which are extended upwardly from the right and left edges of the bottom wall 18, respectively. A wire-like part holding auxiliary wall 21 is extended horizontally from the upper edge of the right side wall 20. The protector body 11 has pairs of rib-shaped locking pieces 23 and 24 for supporting a wire-like part (described later). Those locking pieces 23 and 24 are protruded from the side wall 20 and the wire-like part holding auxiliary wall 21, respectively, in such a manner that, when the protector is mounted in position, they are arranged along the wire harness laying line at predetermined intervals.

The bottom wall 18 has clamp members 28 on the outer surface in such a manner that, when the protector is mounted in position, those clamp members 28 are arranged along the

4 wire harness laying line at suitable intervals. The clamp members 28 are engaged with mounting holes 27 formed in the vehicle body frame 26, to fixedly secure the protector body 11 to the latter 26. The clamp members 28 are known in the art. That is, the clamp to members 28 are each used to clamp the vehicle body frame 26 with both a flexible elastic piece 29 which is elastically displaceable in a direction of the diameter of the mounting hole 27, and a flange 30 provided at the base of the clamp member 28.

As shown in FIGS. 3 and 4, the protector body 11 has a predetermined length so as to fixedly accommodate the wire harness 12 along the wire harness laying line in the trunk. As shown in FIG. 4, a pair of tongue-shaped tape binding pieces 31 are extended from both ends of the bottom wall 18, respectively. The wire harness 12 accommodated in the harness accommodating groove 17 is fixedly bound to those tape binding pieces 31 with tape, so that the wire harness 12 is fixedly secured to the protector body 11.

The protector cover 15 is extended along the wire harness laying line in the trunk. The protector cover 15 is inverted-U-shaped in section, comprising an upper wall 33, and a pair of side walls 34 and 35 which are extended from both edges of the upper wall 33, respectively. The distance between the inner surfaces of the two side walls 34 and 35 of the protector cover 15 (hereinafter referred to as "an inner width", when applicable) is slightly larger than the width of the protector body 11. The protector cover 15 is engaged with the protector body 11 in such a manner that its upper wall 33 closes the opening of the wire harness accommodating groove 17 of the protector body 11.

With the protector body 11 covered with the protector cover 15, a space 38 is provided outside the right side wall 20 of the protector body 11 in such a manner that it is opened towards the mounting surface of the wire harness protector 10; that is, towards the vehicle body frame 26. This space 38 serves as a wire-like part accommodating groove M which accommodates a wire-like part 37 so that the latter 37 is laid along the wire harness 12.

The wire-like part 37 is, for instance, a washer solution pipe used to supply a window washer solution to the rear window, or a trunk opener wire used to open and close the trunk. The wire-like part 37 is laid in the wire-like part accommodating groove M, and held by the above-described pairs of rib-shaped locking pieces 23 and 24. That is, the wire-like part 37 is positively held in the groove M.

The wire harness protector 10 is designed as described above. Hence, when the protector body 11 which has held the wire harness 12 is covered with the protector cover 15, the wire-like part accommodating groove M is formed outside the side wall 20 of the protector body 11 which is opened towards the mounting surface of the wire harness protector 10 as was described before.

Hence, the wire-like part 37 to be laid along the wire harness laying line can be fixedly accommodated in the wire-like part accommodating groove M before the wire harness protector 10 is mounted on the vehicle body frame 26. When the wire harness protector 10 is fixedly mounted on the vehicle body frame 26, the wire-like part accommodating groove M is closed with the vehicle body frame 26.

When the wire harness protector 10 is fixedly mounted on the vehicle body frame 26, the wire-like part 37 is surrounded by the side wall 20 and the wire-like part holding auxiliary wall 21 of the protector body 11, the side wall 35 of the protector cover 15, and the vehicle body frame 26; that is, it is not exposed at all. This feature positively eliminates the difficulty that the wire-like part is damaged being caught by articles accommodated in the trunk, and improves the external appearance of the latter.

In the wire harness protector, the side wall 20 of the protector body 11 forming the wire harness accommodating groove 17, and the side wall 35 of the protector cover 15 covering the protector body 11 define the space 38 which is employed as the wire-like part accommodating groove M; that is, the wire harness protector is simple structure. In addition, in the wire harness protector, the wire harness accommodating groove and the wire-like part accommodating groove are isolated from each other and are high in accommodation capacity. Moreover, the wire harness protector is high in performance, and can be formed at low cost.

The structure that fixedly secures the wire harness protector to the vehicle body frame is not always limited to that which has been described above. That is, the wire harness protector may be secured to the vehicle body frame with screws or any other conventional means. However, the above-described structure wherein the clamp members 28 for fixedly securing the wire harness protector to the vehicle body frame are formed integral with the bottom wall 18 of the protector body 11, is advantageous in that it eliminates troublesome operations such as a screwing operation in mounting the wire harness protector on the vehicle body frame, and the wire harness protector can therefore be fixedly secured to the vehicle body frame with high efficiency.

In the above-described first embodiment, when the protector body 11 is covered with the protector cover 15, the latter 15 is secured to the former 11 by conventional fixing means which is such that a locking groove formed in one of the parts 11 and 15 is engaged with a locking protrusion extended from the other.

The configurations of the protector body and the protector cover forming the wire harness protector are not always limited to those which have been described above. That is, the protector body and the protector cover may be freely modified in configuration as long as they, when engaged with each other, provide the wire-like part accommodating groove M opened towards the vehicle body frame 26.

For instance, as shown in FIG. 5, the protector body 11 may be so modified that its wire harness accommodating groove 17 is opened laterally, and the opening of the groove 17 is closed by the side wall 34 of the protector cover 15. This is a second embodiment of the invention.

In addition, the first embodiment may be so modified that the rib-shaped locking pieces 24 are protruded from the right side wall 35 of the protector cover 15. In the modification, the locking pieces 24 may be used as locking protrusions to lock the outer end portion of the wire-like part accommodating auxiliary wall 21 of the protector body 11, which simplifies the coupling means between the protector body 11 and the protector cover 15.

A third embodiment of the invention is as shown in FIG. 6. In the third embodiment, its protector body 11 is substantially U-shaped in cross section; that is, it can be obtained by eliminating the wire-like part accommodating auxiliary wall 21 from the protector body 11 in the first embodiment. And its pairs of rib-shaped locking pieces 23 and 24 are extended from the protector cover 15. In this case, in order to lock the protector body 11, locking protrusions 40 may be extended from the locking pieces 23.

A fourth embodiment of the invention, as shown in FIG. 7, comprises: a protector body 11 which is substantially S-shaped in cross section, having a wire harness accommodating groove 17 and a wire-like part accommodating groove M which are opened in the opposite directions; and a protector cover which is in the form of a simple flat plate (not shown). In the fourth embodiment, it is preferable to use a protector cover which is substantially U-shaped in cross section similarly as in the case of the first embodiment, because it is possible to decrease the wall thicknesses of the protector body and the protector cover and to increase the mechanical strength of the wire harness protector.

In the first embodiment, the clamp members for fixedly securing the wire harness protector to the vehicle body frame are provided on the protector body; however, the invention is not limited thereto or thereby. That is, the clamp members may be extended from the protector cover.

The wire harness protector of the invention is designed as described above. Hence, when the protector cover is engaged with the protector body which has fixedly accommodated the wire harness in the wire harness accommodating groove, the wire-like part accommodating groove is formed in such a manner that it is located inside the protector cover and outside the side wall of the protector body, and it is opened towards the mounting surface of the wire harness protector.

Therefore, the wire-like part to be laid along the wire harness laying line can be fixedly accommodated in the wire-like part accommodating groove before the wire harness protector is mounted on a vehicle body frame or the like. The opening of the wire-like part accommodating groove is closed by fixedly mounting the wire harness protector on the vehicle body frame or the like.

When the wire harness protector is fixedly mounted on the vehicle body frame or the like, the wire-like part is surrounded by the side walls of the protector body and of the protector cover and by the vehicle body frame or the like; that is, it is not exposed, thus being protected. Hence, the wire harness protector is free from the difficulty that the wire-like part is caught and damaged by external articles. In addition, the wire harness protector itself is fine in external appearance.

The protector body and the protector cover are so designed in sectional configuration that the wire-like part accommodating groove is the space which is defined by the side wall of the protector body which defines the wire harness accommodating groove and the side wall of the protector cover which covers the protector body. This feature simplifies the structure of the wire harness protector and allows the wire harness accommodating groove and the wire-like part accommodating groove to be isolated from each other and high in accommodation capacity. Thus, the wire harness protector of the invention is low in manufacturing cost and high in performance.

What is claimed is:

1. A wire harness protector, to be laid along a wire harness laying line of a mounting surface while fixedly accommodating a wire harness, comprising:

a protector body having a wire harness accommodating groove, extendible along said wire harness laying line, to accommodate said wire harness;

a one-piece protector cover removably engageable with said protector body to cover an opening of said wire harness accommodating groove; and a wire-like part accommodating groove disposed adjacent to and outside of a side wall of said protector body which defines said wire harness accommodating groove, wherein said wire-like part accommodating groove is opened towards said mounting surface to accommodate a wire-like part which is to be laid along said wire harness laying line, wherein said wire-like part accommodating groove has locking pieces for holding said wire-like part in said wire-like part accommodating groove and said locking pieces are disposed on said protector cover, and said protector cover has locking protrusions engageable with said protector body to retain said protector cover on said protector body, said locking protrusions being integrally formed with said locking pieces.

2. A wire harness protector as claimed in claim 1, wherein said wire-like part accommodating groove is a space which is defined by said side wall of said protector body which defines said wire harness accommodating groove and a side wall of said protector cover which covers said protector body.

3. A wire harness protector as claimed in claim 1, further comprising a clamp member for fixedly securing said wire harness protector to said mounting surface, said clamp member being integrally formed with a bottom wall of said protector body.

4. A wire harness protector as claimed in claim 1, wherein said opening of said wire-harness accommodating groove is disposed opposite said side wall of said protector body.

5. A wire harness protector as claimed in claim 1, wherein said protector body is substantially U-shaped in cross section.

6. A wire harness protector as claimed in claim 1, wherein said protector body is substantially S-shaped in cross section, and said wire harness accommodating groove and said wire-like part accommodating groove open in opposite directions.

* * * * *